US012759089B2

(12) United States Patent
Gerth et al.

(10) Patent No.: US 12,759,089 B2
(45) Date of Patent: Oct. 13, 2026

(54) DEVICE FOR TRIMMING AND WELDING STRIP ENDS AND A METHOD FOR HEATING STRIP ENDS TO BE JOINED BY MEANS OF WELDING TECHNOLOGY

(71) Applicant: Fritz Orbke Baustoffgrosshandlung GmbH, Erwitte (DE)

(72) Inventors: Helmut Gerth, Herne (DE); Dirk Baumeister, Dortmund (DE)

(73) Assignee: Fritz Orbke Baustoffgrosshandlung GmbH, Erwitte (DE)

( * ) Notice: Subject to any disclaimer, the term of this patent is extended or adjusted under 35 U.S.C. 154(b) by 516 days.

(21) Appl. No.: 18/511,038

(22) Filed: Nov. 16, 2023

(65) Prior Publication Data

US 2024/0165747 A1 May 23, 2024

(30) Foreign Application Priority Data

Nov. 17, 2022 (DE) ..................... 10 2022 004 248.7

(51) Int. Cl.
*B23K 26/00* (2014.01)
*B23K 26/21* (2014.01)
*B23K 26/361* (2014.01)
*B23K 26/60* (2014.01)

(52) U.S. Cl.
CPC .............. *B23K 26/60* (2015.10); *B23K 26/21* (2015.10); *B23K 26/361* (2015.10)

(58) Field of Classification Search
CPC ...... B23K 26/60; B23K 26/21; B23K 26/361; B23K 2103/04; B23K 26/32; B23K 2101/34; B23K 26/082; B23K 15/006; B23K 1/0056; B23K 2101/18; B23K 2101/185; B23K 2103/06; B23K 2103/08; B23K 2103/10; B23K 2103/12; B23K 2103/18; B23K 26/06; B23K 26/062
USPC ............ 219/121.64, 121.14, 121.63, 121.84, 219/121.85, 85.12, 85.13, 88
See application file for complete search history.

(56) References Cited

U.S. PATENT DOCUMENTS 3,378,185 A * 4/1968 Lohrenz ................. B23K 9/025 228/5.7
4,684,779 A * 8/1987 Berlinger ........... B23K 26/1436 219/121.84
5,595,670 A * 1/1997 Mombo-Caristan ... B23K 26/06 219/121.64
2006/0261045 A1* 11/2006 Wang ................... B23K 1/0056 219/121.85

(Continued)

FOREIGN PATENT DOCUMENTS

DE 1499045 A1 * 10/1969 ............. B21D 43/00

*Primary Examiner* — Jacob A Smith
(74) *Attorney, Agent, or Firm* — Collard & Roe, P.C.

(57) ABSTRACT

A device for trimming and welding strip ends, in particular for use on laser welding devices or resistance welding machines, in which the strip ends to be joined are positioned at a distance from one another and are trimmed parallel to one another before welding by a mechanical cutting device, includes at least one heating device provided on the laser welding device for heating the actual welding region that can be positioned relative to at least one of the cutting regions of the strip ends to be joined before cutting and can be actuated in such a way that the cutting region is heated and at least one strip end can subsequently be cut in the heated state. A corresponding method is also described.

21 Claims, 12 Drawing Sheets

(56) References Cited

U.S. PATENT DOCUMENTS

| | | | | |
|---|---|---|---|---|
| 2010/0078412 | A1* | 4/2010 | Diez | B23K 26/348 219/121.64 |
| 2020/0016697 | A1* | 1/2020 | Schmit | B23K 9/173 |
| 2020/0246917 | A1* | 8/2020 | Li | B23K 26/21 |

* cited by examiner

Fig. 4A
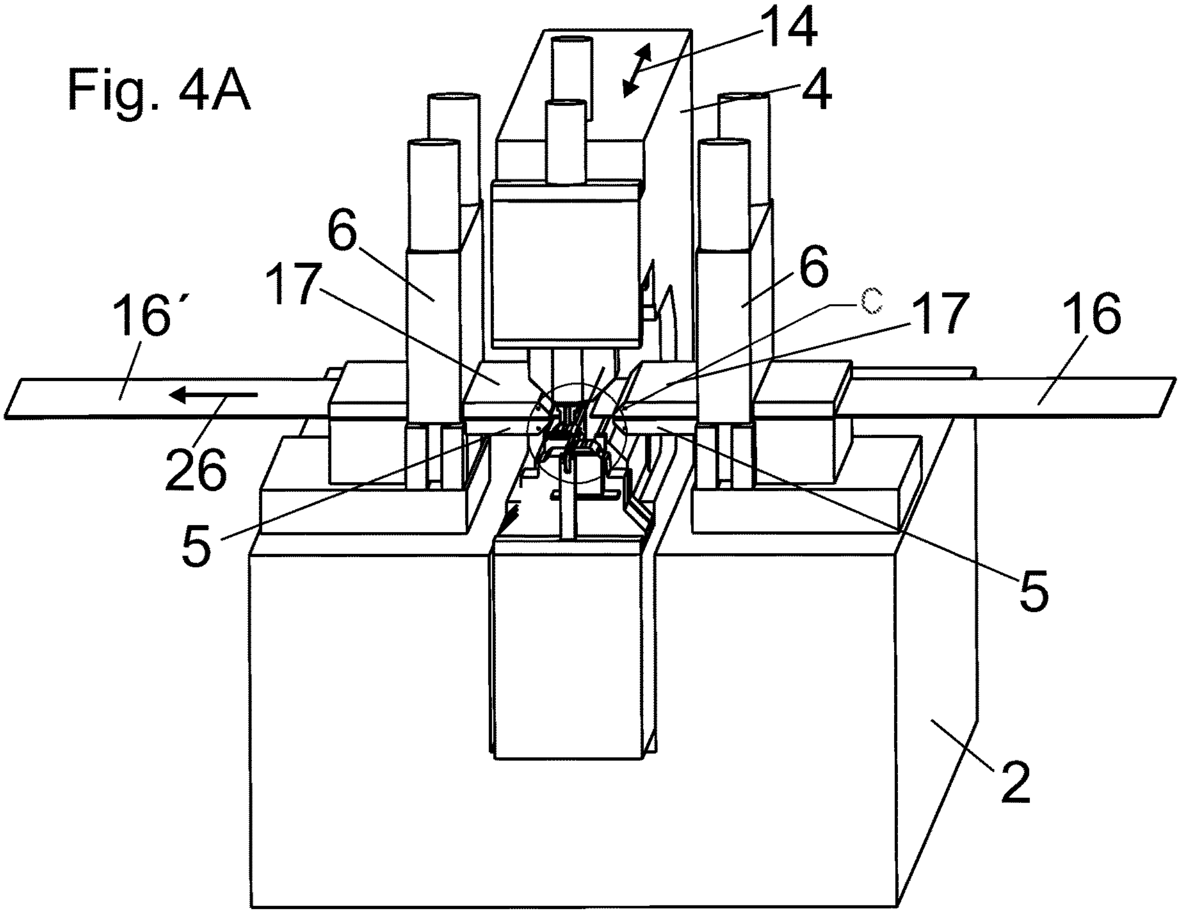
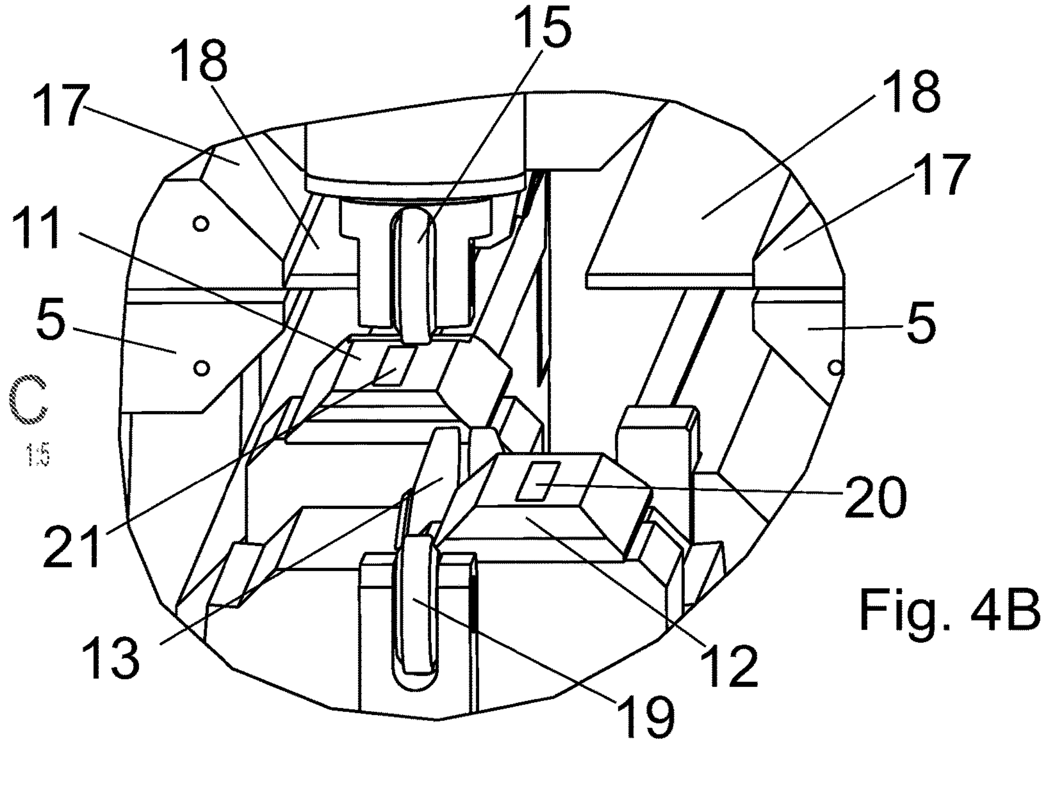
Fig. 4B

Fig. 5A
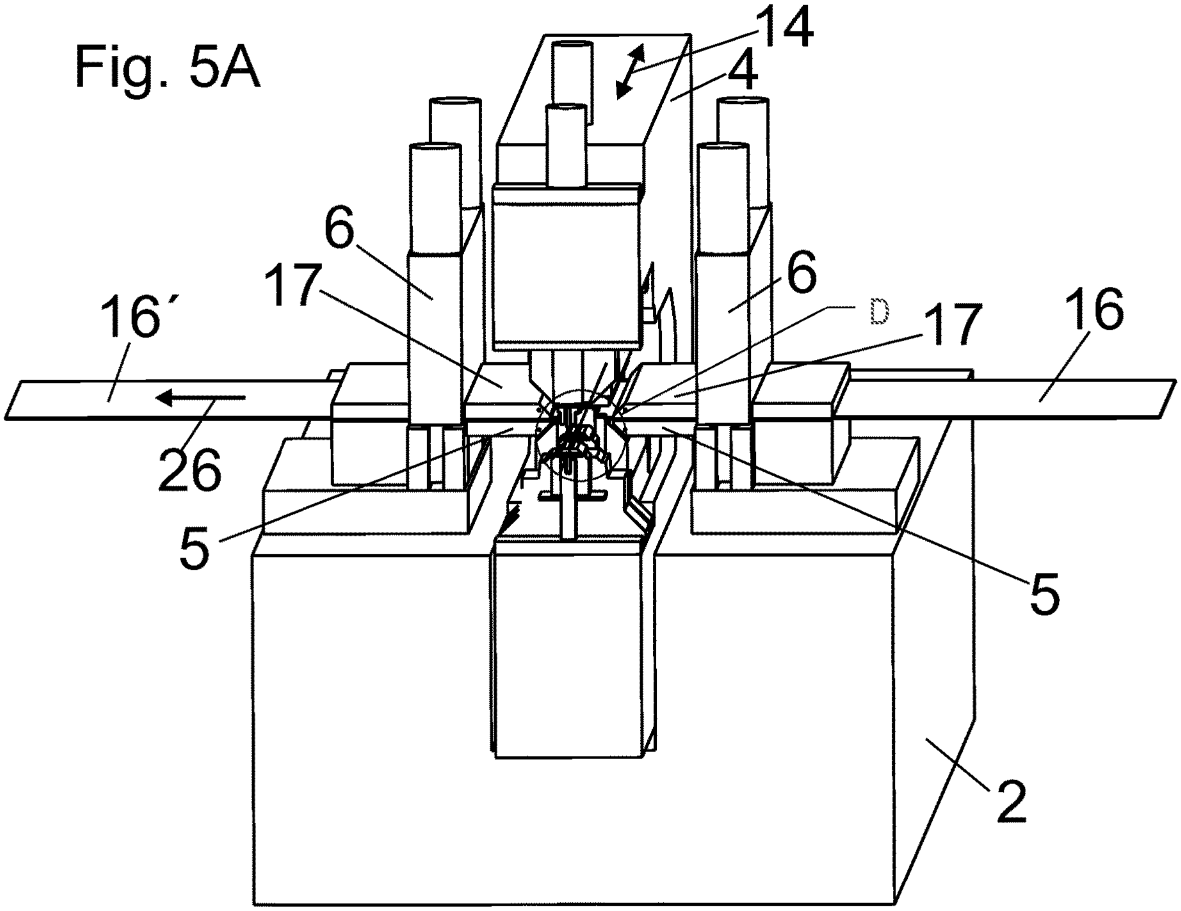
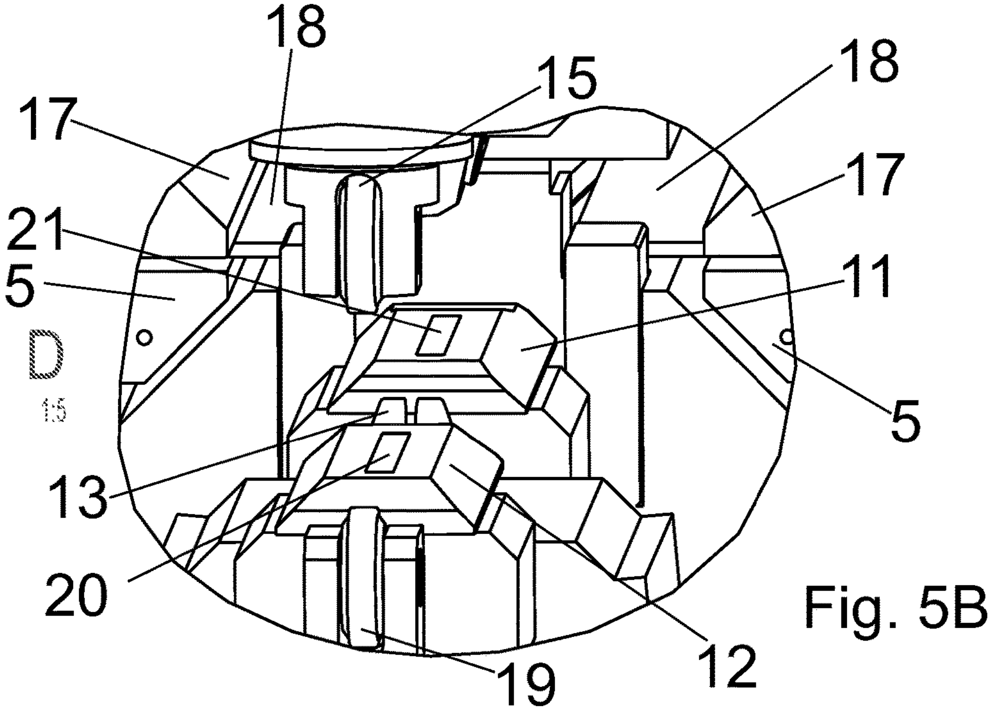
Fig. 5B

Fig. 6A
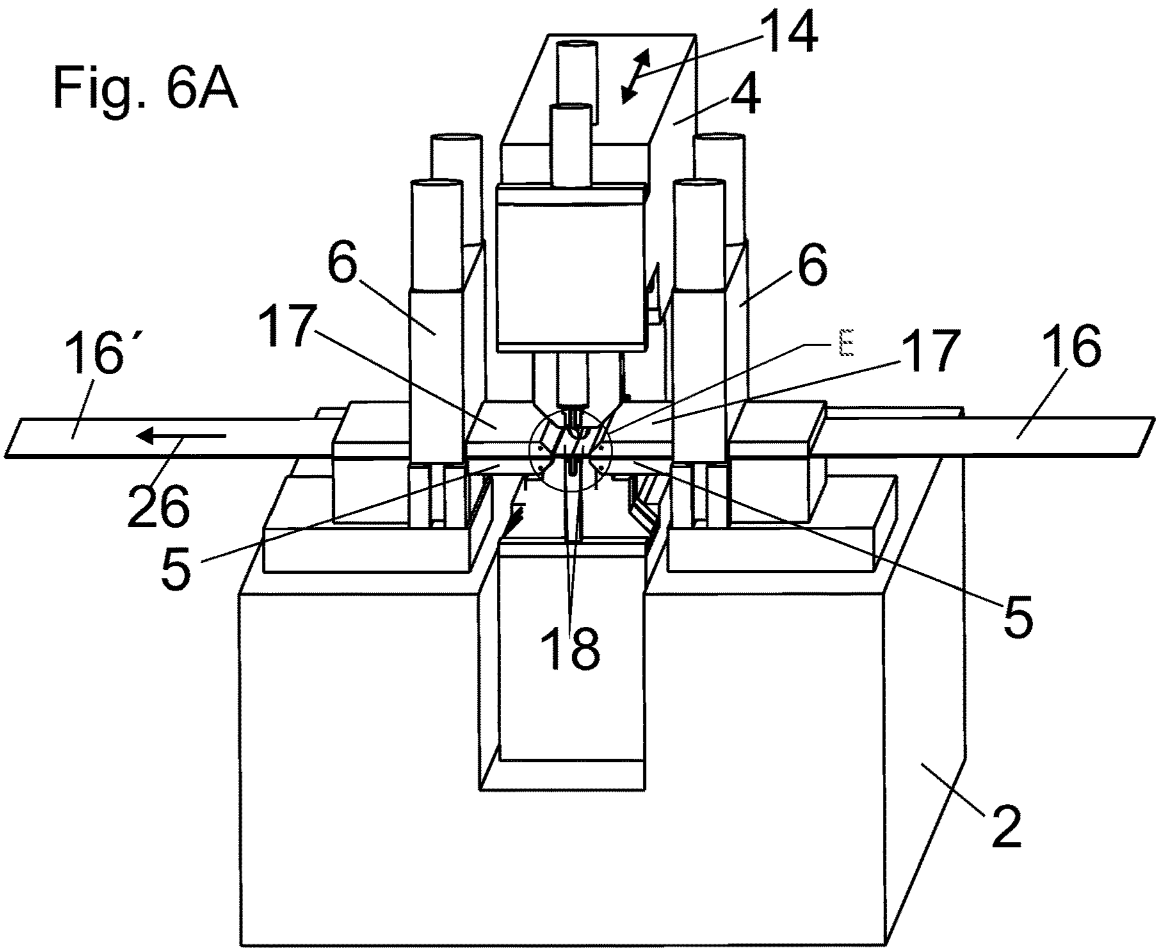
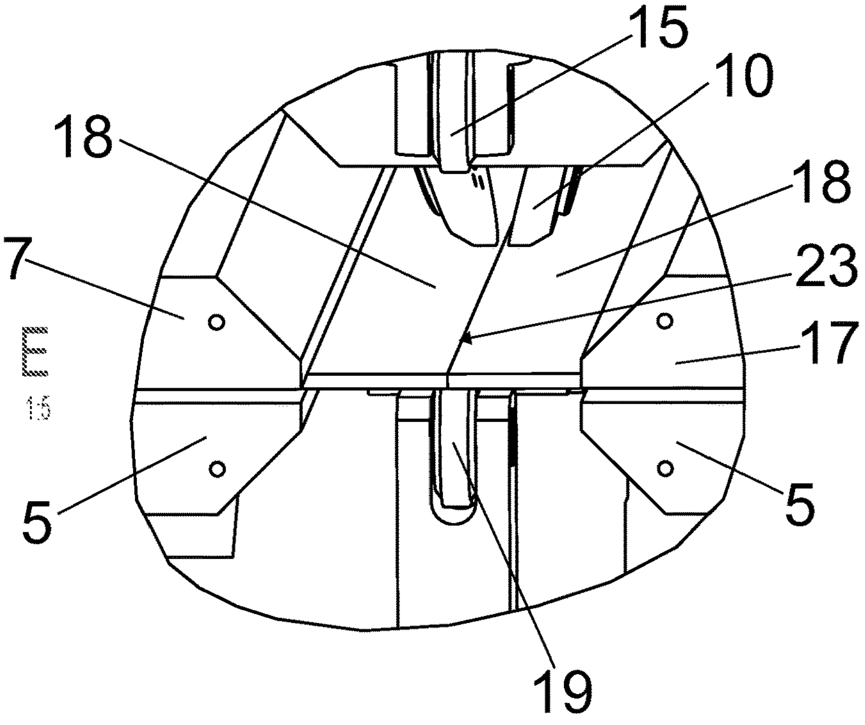
Fig. 6B

Fig. 7A
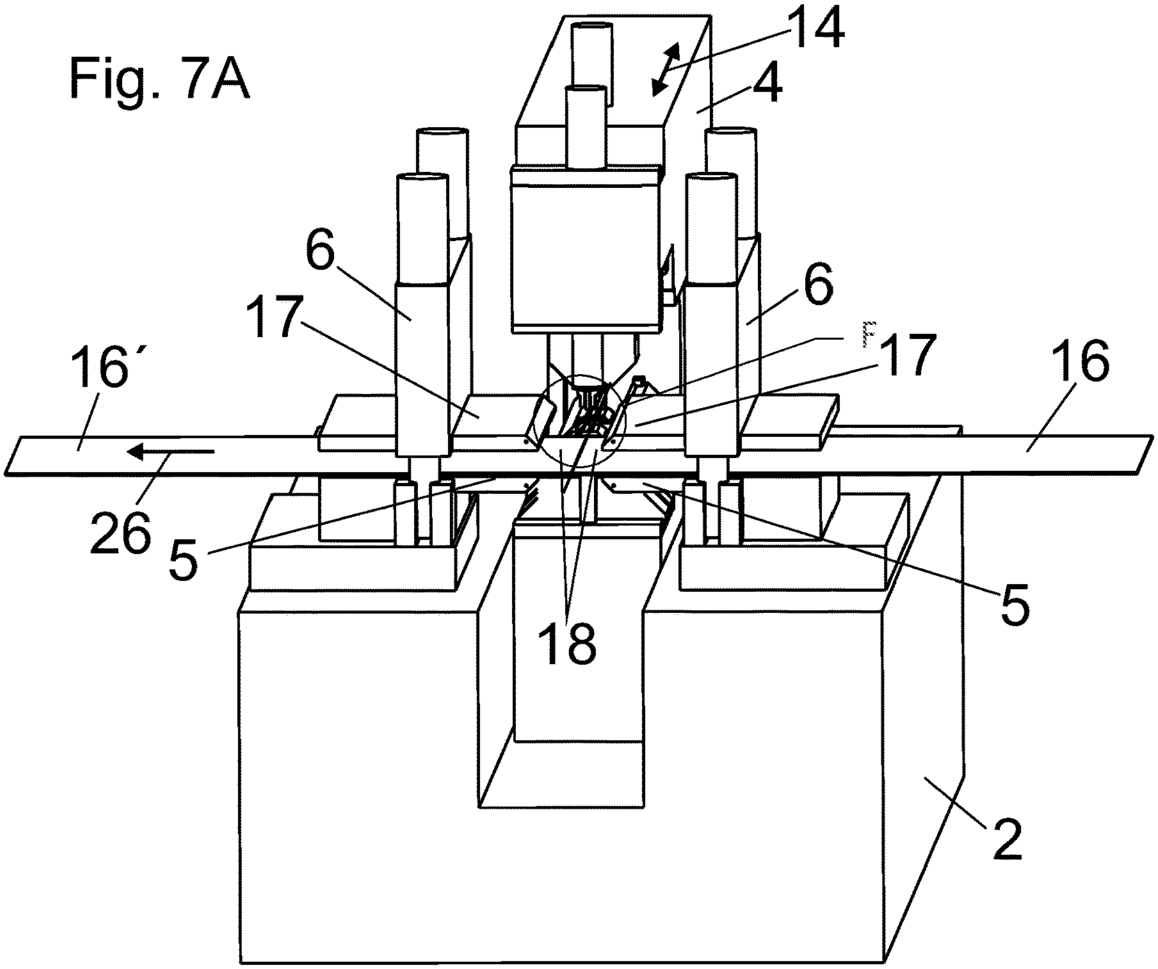
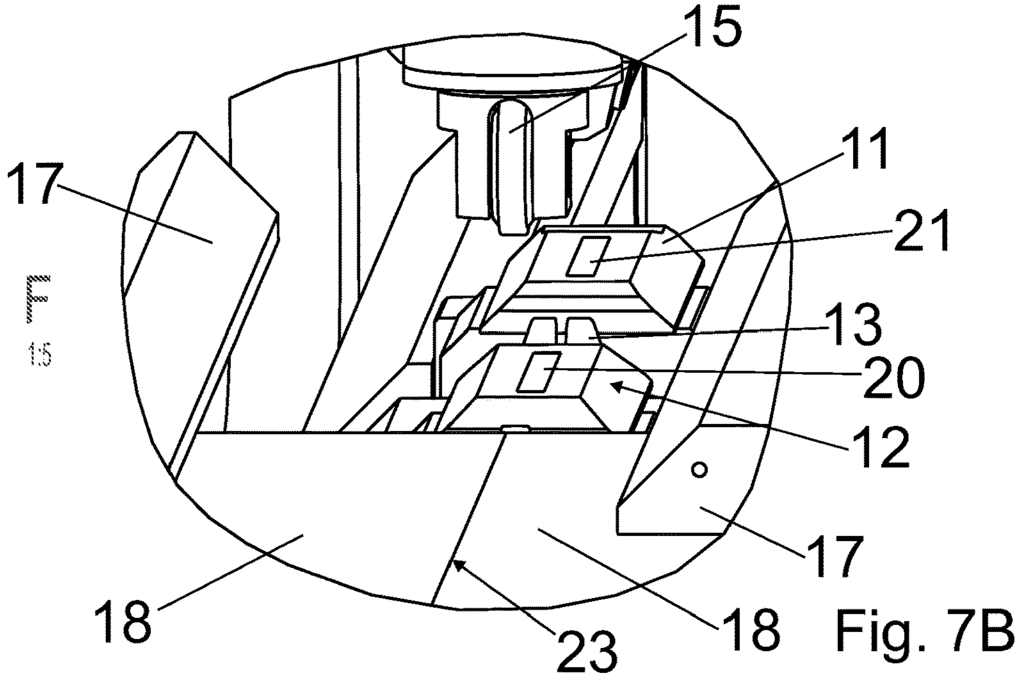
Fig. 7B

Fig. 9A
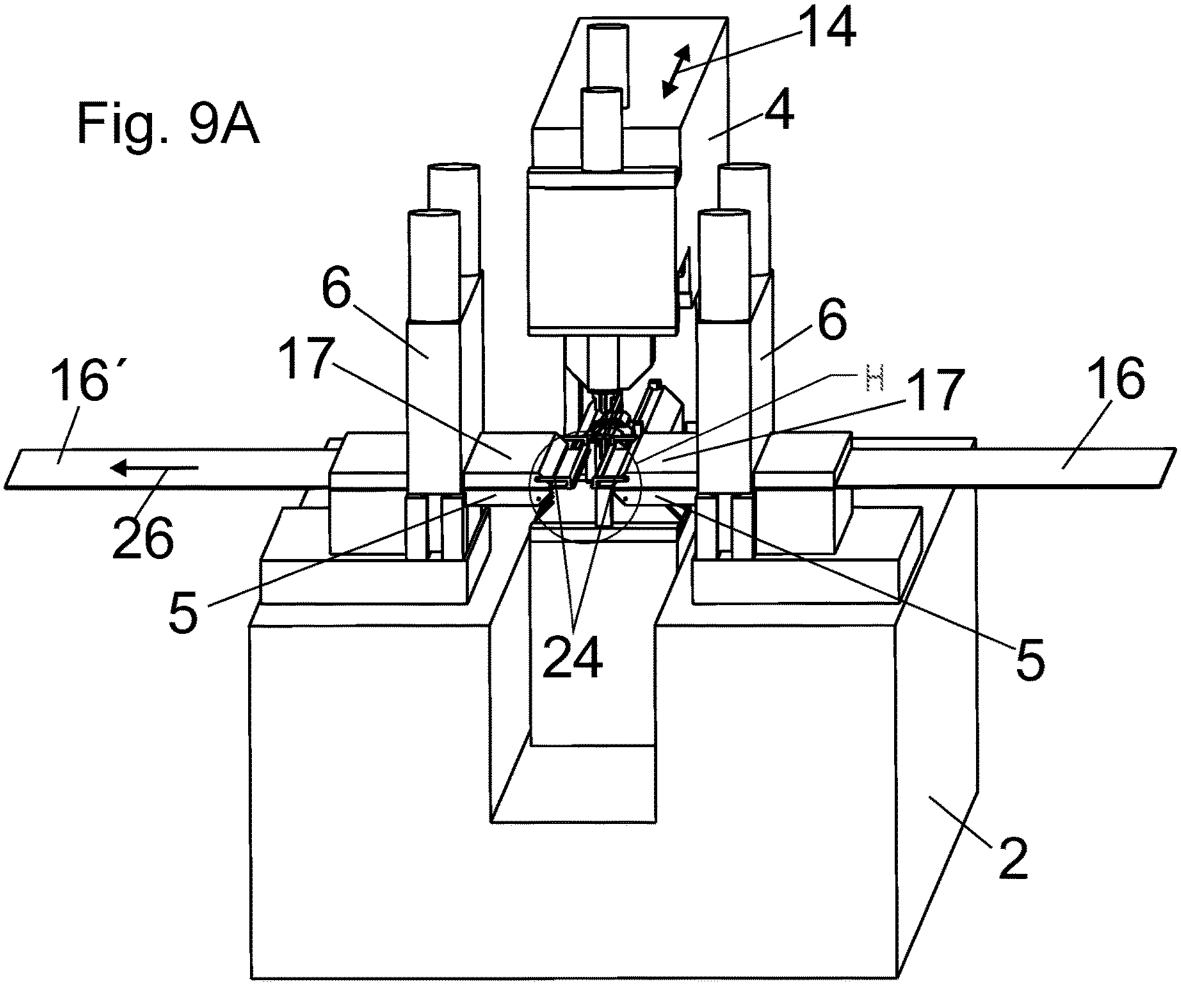
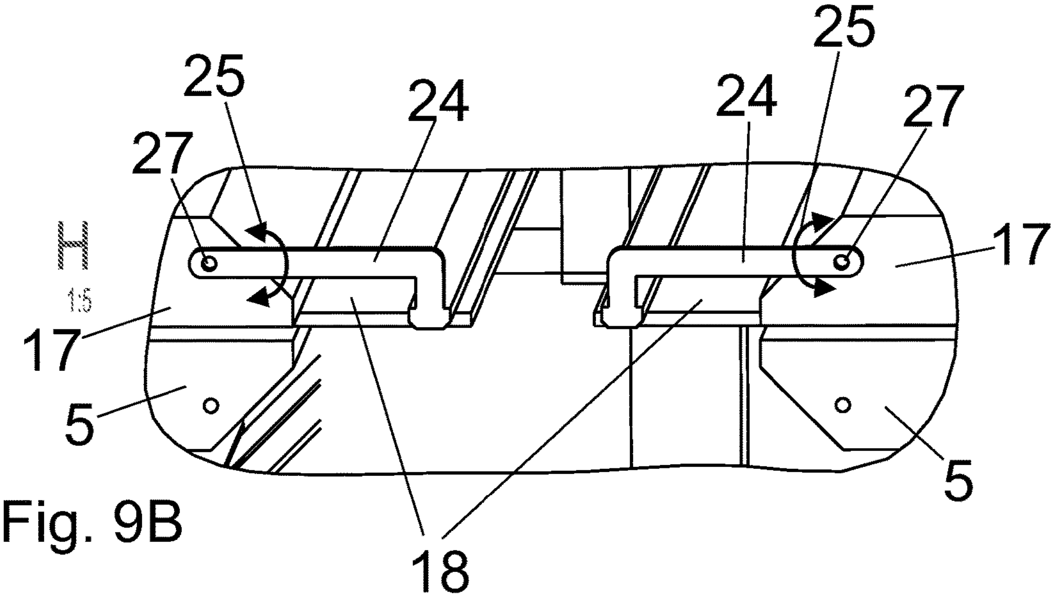
Fig. 9B

DEVICE FOR TRIMMING AND WELDING STRIP ENDS AND A METHOD FOR HEATING STRIP ENDS TO BE JOINED BY MEANS OF WELDING TECHNOLOGY

CROSS REFERENCE TO RELATED APPLICATIONS

Applicant claims priority under 35 U.S.C. § 119 of German Application No. 10 2022 004 248.7 filed Nov. 17, 2022, the disclosure of which is incorporated by reference.

BACKGROUND OF THE INVENTION

1. Field of the Invention

The invention relates to a device for trimming and welding strip ends and to a method for heating strip ends to be joined by welding.

2. Description of the Related Art

Laser processing devices are increasingly used, for example, for laser welding or laser cutting of metallic materials or plastics, in that high-energy laser radiation, for example from a fiber laser, is applied in a targeted manner, for example to workpieces or workpiece edges to be welded, where it locally melts and welds the material of the workpieces. The high-energy laser radiation required for this has the great advantage of acting very selectively on the workpieces and, in contrast to gas welding, for example, only changing the material properties of the workpieces spatially to a very small extent due to the heat-affected zone that is created. In addition, welding by means of a laser beam is a fast welding process, which is why it is preferred for time-critical welds, for example.

Laser welding is of particular advantage, similar to resistance welding machines, for joining strip ends that are put together from individual longer pieces of strip, usually reeled up, and processed quasi continuously, for example in rolling facilities, for pickling or the like. For this purpose, the strip ends of strips to be processed one after the other are welded to each other. Such a welding machine is usually located in the infeed of a processing line for processing the strips. To ensure a continuous processing of the strips, the machine welds the strip end of the strip that is currently being processed, e.g. in a pickling line or a rolling mill, to the strip beginning of another strip that is to be processed subsequently. For the preparation of the weld seam of the strips to be welded, a shear cut is usually made, e.g. with a double-cutting shear, by which smooth and parallel strip ends are produced in the area of the subsequent welding.

The welding device usually consists of a base frame to which clamping tables are attached for positioning and clamping the strip ends to be positioned relative to each other. A C-frame (C-carriage) moves on this base frame, on which the cutting and welding components including the equipment for pre- and post-heating of the welding area are arranged. Thus, the preheating and post-heating of the welding area takes place in one movement with the welding process. The C-frame moves over the area of the strip ends positioned in front of each other and moves the laser along the adjacent strip ends so that these strip ends can be welded together. In addition to the laser welding process, resistance welding processes are also used in this type of welding equipment, such as roller seam welding or spot welding. When laser welding or laser welding devices are specifically referred to in the following, the known resistance welding processes are also meant and included in the teachings of the present invention.

The conventional procedure for trimming the strip ends and welding in such welding devices is as follows:

The incoming and outgoing bands are centered relative to each other with the clamping tables and then clamped, The C carriage moves to the cutting position, where the welding device is usually positioned outside the strip ends and where the strip ends are only welded during the return stroke to the starting position, The cutting process is carried out e.g. with a double-cutting shear, The welding process, including preheating and post-heating of the welding area, takes place during the return stroke of the welding device to the starting position.

The disadvantage of this procedure is that the trimming of the strip ends, e.g. by means of double-cutting shears, requires high process forces and, especially in the case of high-strength materials, can only be carried out relatively inaccurately due to the cutting conditions and the unavoidable breaking structure of the cut surface, which means that the weld preparation is not optimal.

SUMMARY OF THE INVENTION

It is therefore the task of the present invention to further develop a device and a method of the kind described in that the trimming of the strip ends to be welded to one another is simplified and improved without substantially increasing the technical expenditure for trimming.

The solution of the task results from the features of the device according to one aspect of the invention and the features of the method according to another aspect of the invention. Further advantageous embodiments of the invention are discussed below.

The invention is based on a device for trimming and welding strip ends, in particular for use on laser welding devices or resistance welding machines, in which the strip ends to be joined are positioned at a distance from one another and are trimmed parallel to one another before welding by means of a mechanical cutting device. A device of this type is further developed in accordance with the invention in that at least one heating device for heating the actual welding area on the laser welding device can be positioned relative to at least one of the cutting areas of the strip ends to be joined before trimming and can be actuated in such a way that the cutting area is heated and at least one strip end can then be trimmed in the heated state. The cutting of strip materials in a heated state, which is known per se, is thus realized in a simple manner and without high expenditure in terms of equipment for the welding of strip ends to be fixed to each other, in that the at least one heating device, which is present anyway for heating the actual welding area on the laser welding device, is also used for this purpose, not only to temper the strip ends in the area of the weld seam, but also to temper beforehand the area of the strip ends which lie in the area of the cutting edges, for example of a mechanical cutting device, and thus to favorably influence the cutting behavior of the material of the strip ends to be trimmed. For this purpose, only little equipment is required to move the heating device, which is already present, from its initial position relative to the laser welding device to the area of the cutting edges at the strip ends to be welded and back, in order to also use the heating device, which is already present, for heating in the area of the cutting edges. It makes sense to heat both strip ends with two preferably parallel heating devices at the same time or with a short time lag to each other in the area of the cutting edges, so that approximately the same cutting conditions are present at both strip ends for the subsequent trimming. For this purpose, it is advantageous if two heating devices are provided, namely one heating device for each of the strip ends, which can heat the strip ends parallel to each other.

The heating of the strip ends in the cutting area immediately before the cut has four main advantages:

Cutting of higher sheet thicknesses is possible with the same drive force of the cutting device, as the tensile strength of the material and thus the cutting force decreases with increasing temperature of the cutting area, Cutting of high-strength materials is possible, whose strength exceeds that of the shear blades, Improvement of the cutting result when cutting strips in the roll-hard condition, since the elongation at break of the material is increased by the heating and thus the fraction of the cut surface is reduced, In general, the stressed components of the cutting device, such as the shear body and knives, are subjected to less stress, which leads to a significant increase in the service life of the entire cutting device.

Due to the low expenditure on equipment by using the heating devices already available, these advantages can be used in a cost-effective and particularly economical manner according to the invention, so that the welding of the strip ends can be shortened and the quality of the weld can be improved.

In a first advantageous embodiment, it is conceivable that the heating device is designed to heat the cutting area locally and to be movable along the cutting area. In this way, for example, the movement devices of the welding device for the actual welding can also be used in order to also carry out the working movements of the heating device when heating the strip ends. Thus, only additional movement devices are required to position the heating device from its position relative to the welding device to its position for heating the strip ends in the area of the cutting edge and back. This also makes it possible for the at least one heating device to be arranged so that it can be moved during the positioning of the laser welding device in the run-up to welding and before trimming along the cutting area, and thus processing time can be saved, since the normal feed movement of the welding device for reaching the starting position for welding and cutting the strips can be used at the same time for heating the strip ends, and thus the cycle time for the overall process of joining the strip ends is only insignificantly increased or not increased at all.

It is also advantageous if the at least one heating device can be moved, preferably transversely to the direction of movement of the laser welding device, and positioned in the cutting area. By such a movement transverse to the direction of movement of the laser welding device, the heating device or devices, e.g. two heating devices, can be easily moved into the area of the strip ends, which are usually positioned at a greater distance from each other for trimming, in order to create space for the cutting device working in between. Only after trimming the trimmed strip ends are positioned directly in front of each other to set an appropriate welding gap. The transverse positioning of the heating device can advantageously be carried out hydraulically and/or electrically and/or pneumatically transverse to the direction of movement of the laser welding device and can therefore be effected with simple technical means and thus at low cost, for example by pneumatic cylinders displacing the heating device according to its end positions transverse to the direction of movement of the laser welding device.

It is of particular advantage if the at least one heating device has a preheating unit leading the laser welding device and a post-heating unit trailing the laser welding device, which are each arranged transversely to the direction of movement of the laser welding device and are adjustable in opposite directions. Such preheating units and post-heating units are common in the welding of strips in order to temper the area of the weld and the resulting weld seam and to be able to influence the structural properties of the weld seam in a targeted manner. The use of these heating devices for heating the strip ends before trimming thus does not cause any additional costs for separate heating devices. Nevertheless, it is of course conceivable to provide additional heating devices with which the heating can be accelerated or positively influenced in some other way.

In a further embodiment, it is conceivable that the leading preheating unit heats the outgoing strip end and the trailing post-heating unit heats the incoming strip end or vice versa in the cutting area. In other words, the preheating unit and the post-heating unit move a little bit to the side of the laser welding device into the area of the strip ends that are usually spaced apart and are to be trimmed by the cutting device and heat the area of the strip ends to be trimmed, e.g. during the movement of the welding device to the beginning of its welding position, after which the cutting device can trim the strip ends more easily as already described.

In a further embodiment, it is also conceivable that the at least one heating device comprises a heating device operating by means of induction or a heating unit operating by means of a gas burner and/or hot air and/or laser or similar heat source. All technically possible types of heating are conceivable here, whereby the use of the type of heating of the already existing heating device is certainly to be preferred in order to reduce the construction costs. However, it is also conceivable to combine other types of heating.

In another embodiment, it is conceivable that the at least one heating device has at least one beam-like induction coil or other heating device which, after positioning relative to the cutting area of the cutting edges of the strip ends to be joined, simultaneously heats at least one longitudinally extended section along the cutting area. In this case, not only a short section of the cutting area is heated locally as in the above variants, but ideally the entire length of the cutting area is heated simultaneously by the beam-like induction coil or other heating device. This also makes the overrun of the locally acting heating device superfluous, since longer sections of the cutting area or the entire cutting area are heated simultaneously, for which the movement devices of the laser welding device itself are not necessarily required and the laser welding device can stand still. This can be favorable with regard to the time required for heating and thus favorably influence the total cycle time for welding. It is also conceivable, however, to arrange a number of burners or hot air units on a beam-shaped holding device instead of a linearly acting induction coil, which also enable a quasi linear heating of the strip ends.

In a further embodiment, the at least one beam-shaped induction coil can be arranged pivotably in the area of the laser welding device and can be positioned laterally pivotably in the cutting area. Here, too, the pivoting can advantageously be performed hydraulically and/or electrically and/or pneumatically. In another embodiment, the at least one beam-shaped induction coil can be arranged pivotably on the clamping table, preferably above the upper clamping jaw or below the lower clamping jaw, or also in the area of the cutting device, preferably above the upper shear or below the lower shear.

In a further embodiment, the heating device can be arranged on the movable laser welding device in the area above the strip ends to be welded.

The invention further relates according to claim 14 to a method for heating strip ends to be joined by welding, in particular for use on laser welding devices or resistance welding machines, in which the strip ends to be joined are positioned at a distance from one another and are cut parallel to one another by means of a mechanical cutting device before welding. In this case, in accordance with the invention, at least one heating device present on the laser welding device for heating the actual welding area can be positioned and actuated relative to at least one of the cutting edges of the strip ends to be joined before trimming, so that the cutting area is heated and at least one strip end is subsequently cut in the heated state. The advantages of this method according to the invention have already been described in detail above with respect to the device according to the invention, therefore full reference is made thereto.

A particularly preferred embodiment of the device according to the invention on a laser welding device is shown in the drawing.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIGS. 2A, 2B, 3A, 3B, 4A, 4B, 5A, 5B, 6A, 6B, 7A, 7B, 8A, and 8B show a sequence of processing of strip ends by means of preheating and trimming in the course of welding the strip ends by means of laser welding equipment in the form of a kind of sequence plan, FIGS. 9A, 9B, 10A, and 10B show another way of preheating the strip ends by means of induction bars on a device according to FIGS. 2A, 2B, 3A, 3B, 4A, 4B, 5A, 5B, 6A, 6B, 7A, 7B, 8A, and 8B, and FIGS. 11, 12, and 13 show conceivable arrangement of the heating zones in the devices according to FIGS. 2A, 2B, 3A, 3B, 4A, 4B, 5A, 5B, 6A, 6B, 7A, 7B, 8A, and 8B or FIGS. 9A, 9B and 10A, 10B.

DETAILED DESCRIPTION OF PREFERRED EMBODIMENTS

Figure 1:
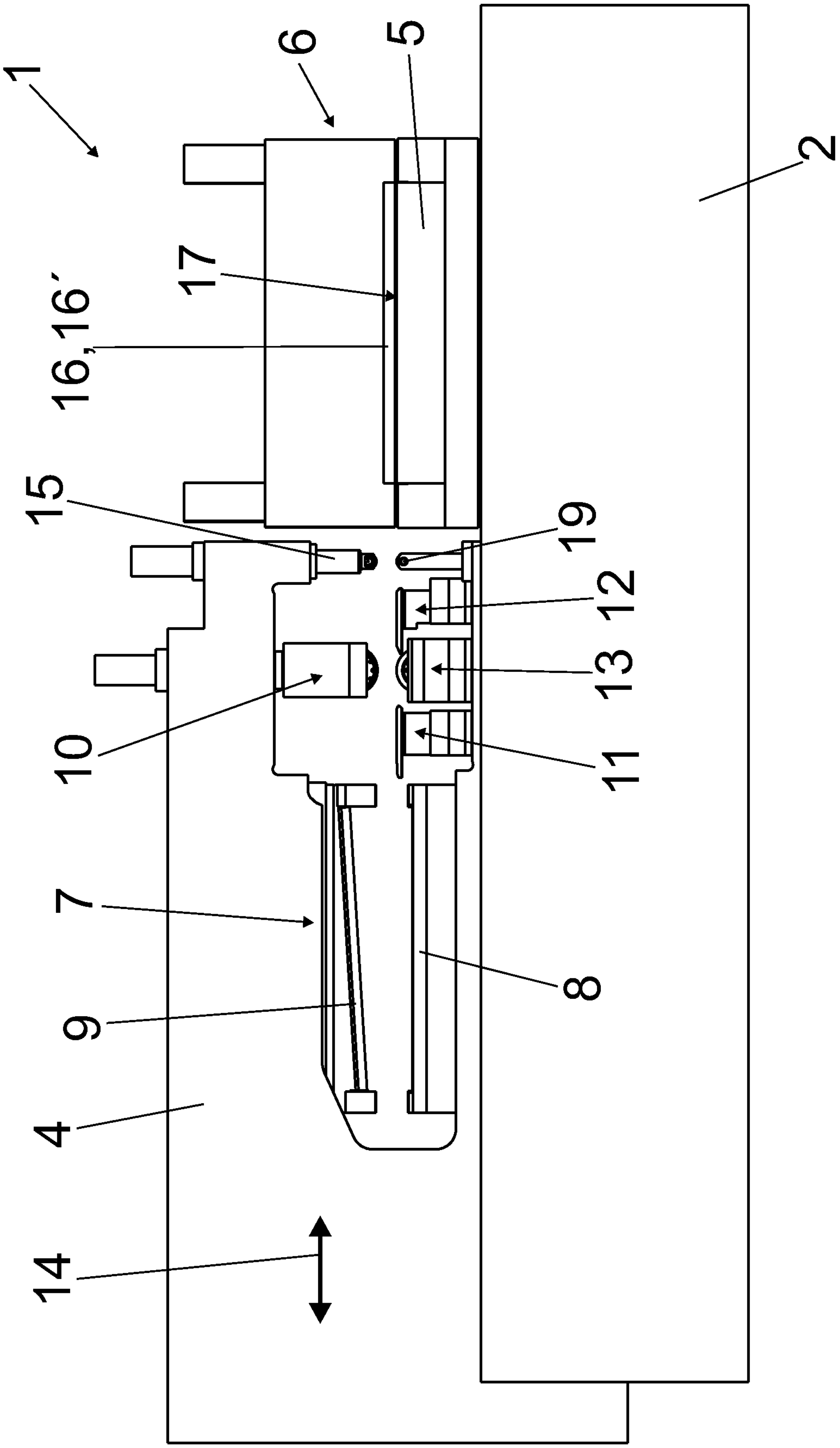
FIG. 1 shows a purely principled representation of a device for trimming and welding strip ends, which is arranged on a laser welding device.

FIG. 1 shows a purely principal representation of a device 1 for cutting and welding strip ends with a laser welding device 10 for joining strip ends 18 of two strips 16, 16' to be processed consecutively. Such a device 1 with a laser welding device 10 is known in principle and will be described here only to the extent that this is relevant for the understanding of the invention.

The device 1 with laser welding device 10 is formed by a C-frame 4 which is movable in the direction of movement 14 relative to a base frame 2. In the starting position shown in FIG. 1, the C-frame 4 is arranged outside the actual area of the strips 16, 16' to be welded, which are held in a clamping and positioning device 6 in the direction of passage 26 of the strips 16, 16' one behind the other but at a distance from each other. The strip 16' with its strip end 18 is arranged in such a way that the strip 16' is already processed in a processing station such as a roller, a pickling machine or the like. The strip 16 is to be welded to the strip 16' so that processing can continue continuously and is unwound, for example, from a reel not shown and fed to the clamping and positioning device 6.

Figure 2A:
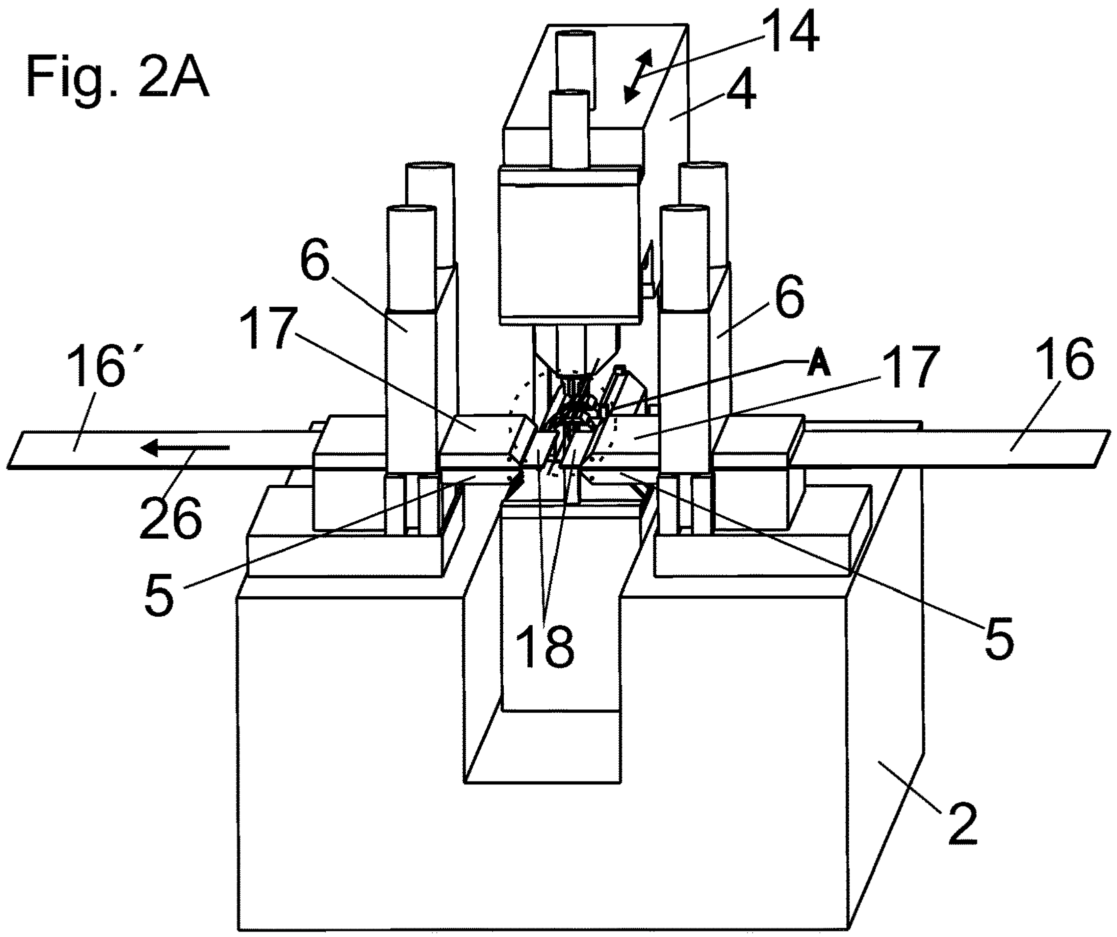
Figure 2B:
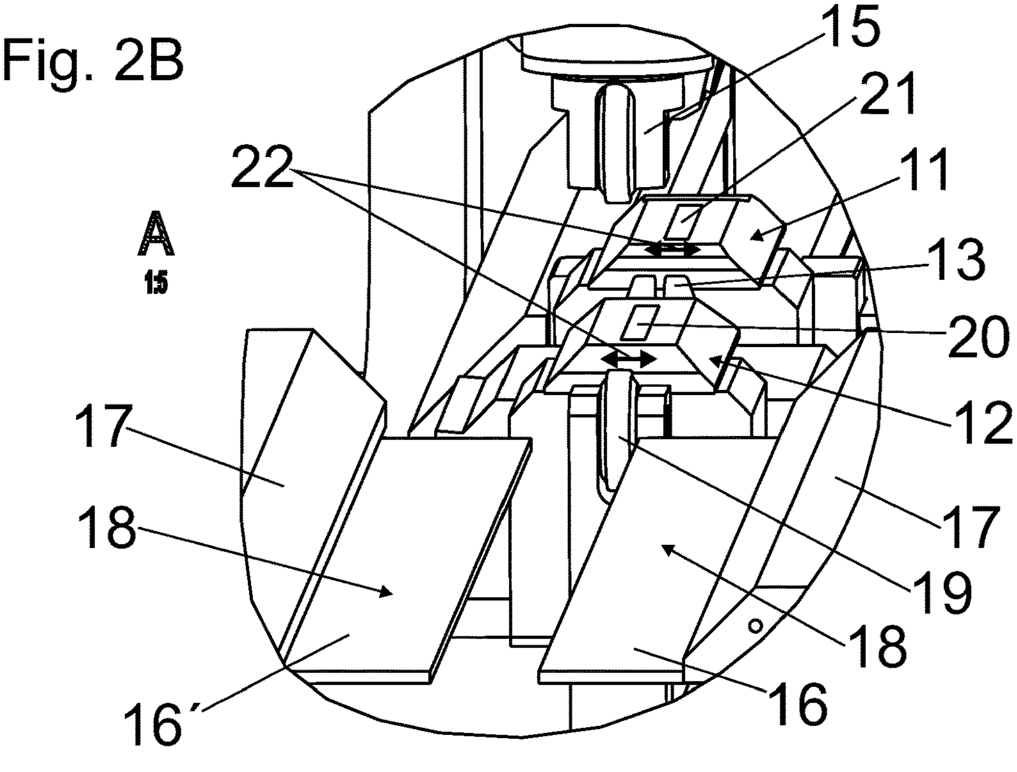
Figure 3A:
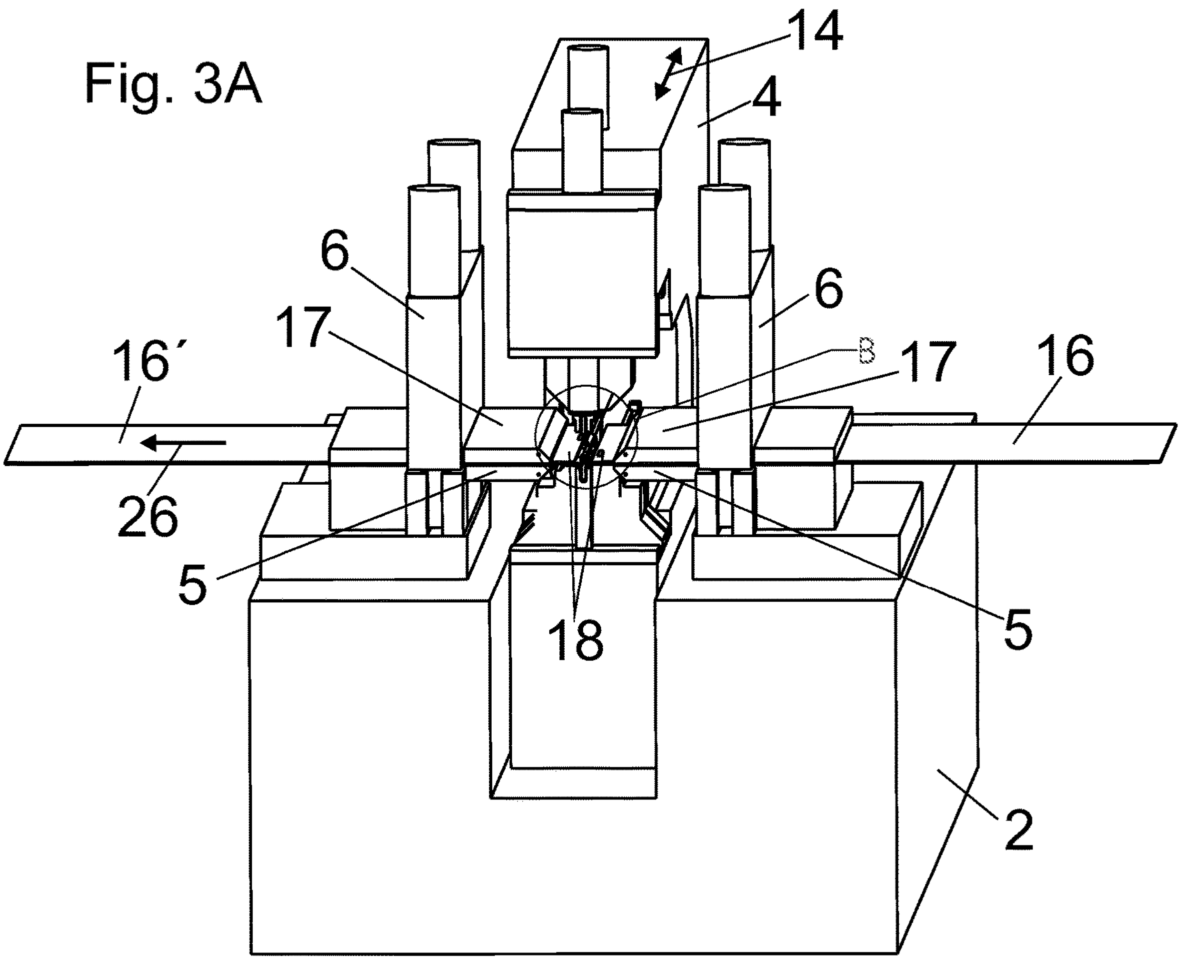
Figure 3B:
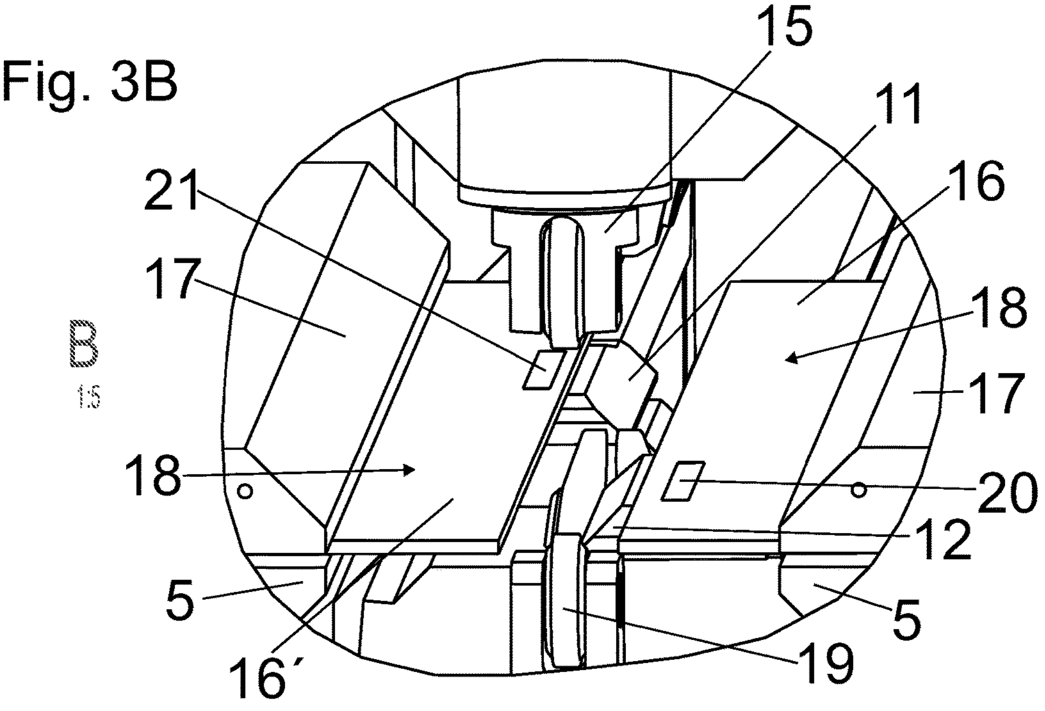
Figure 8A:
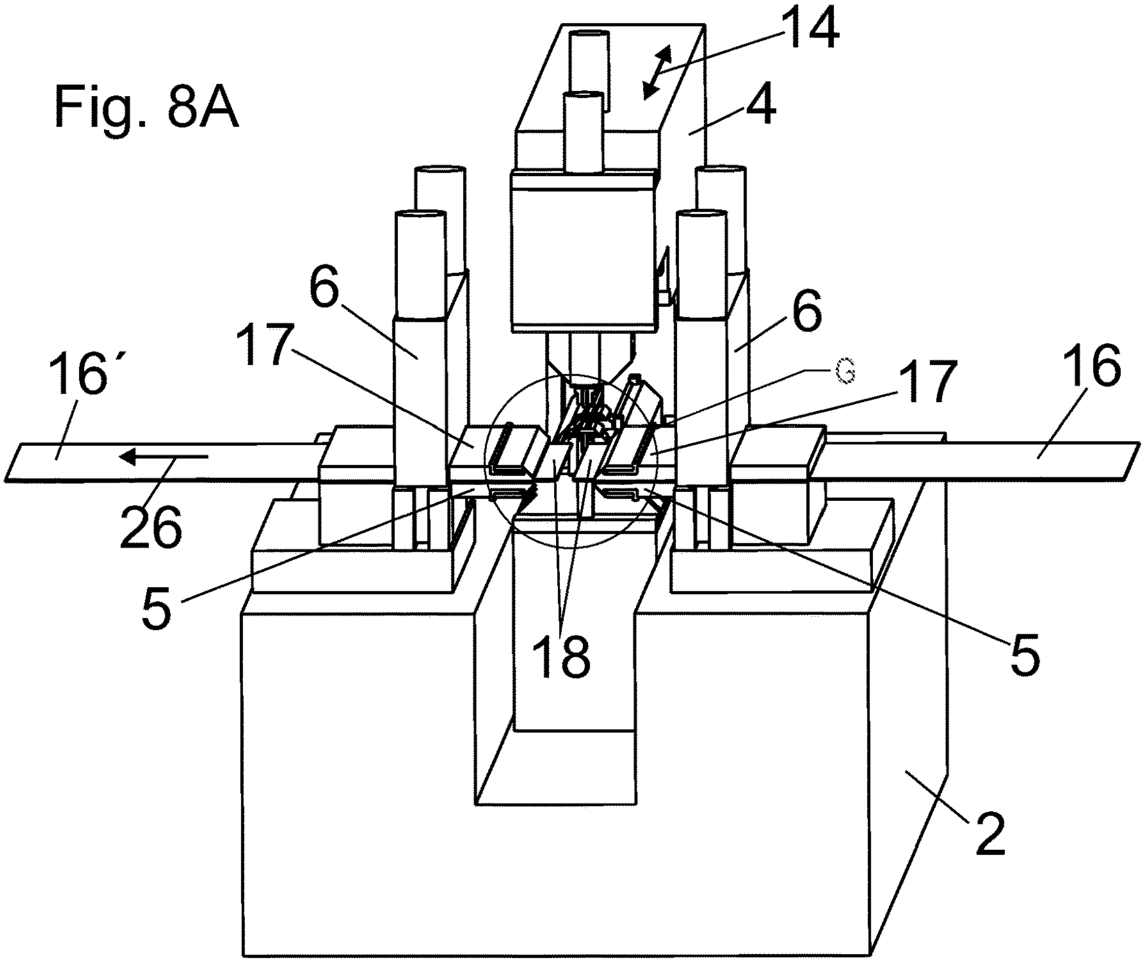
Figure 8B:
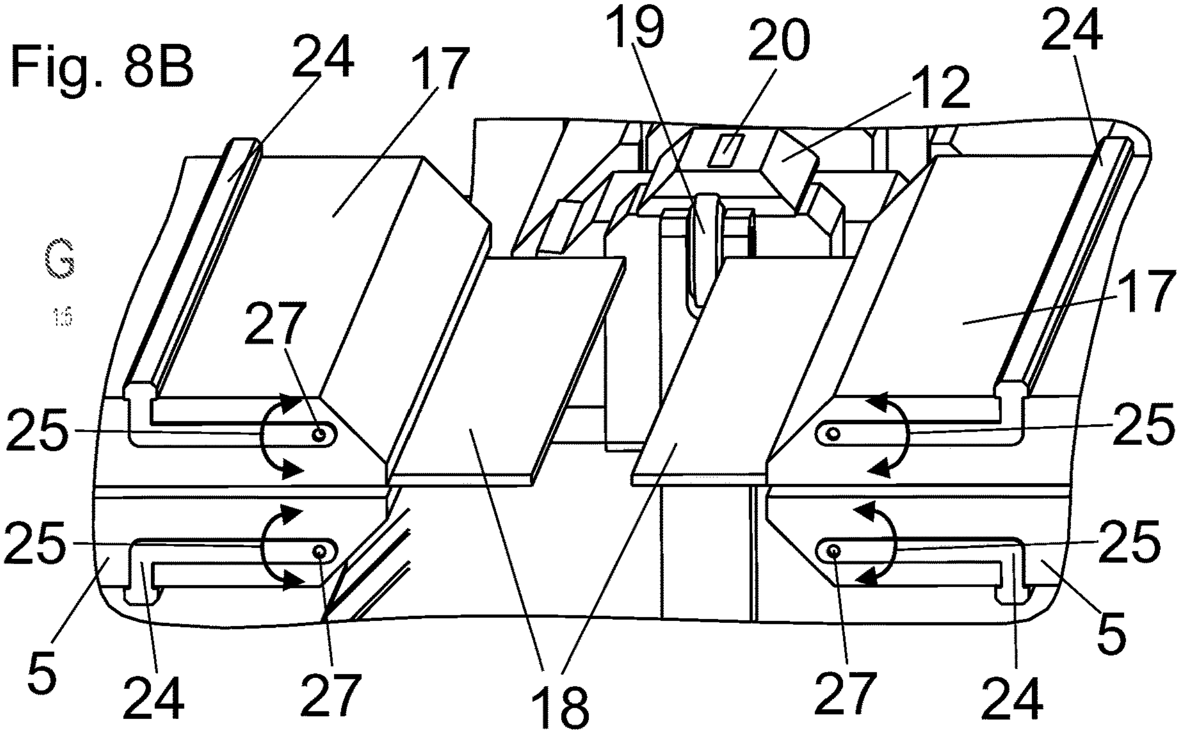
Figure 10A:
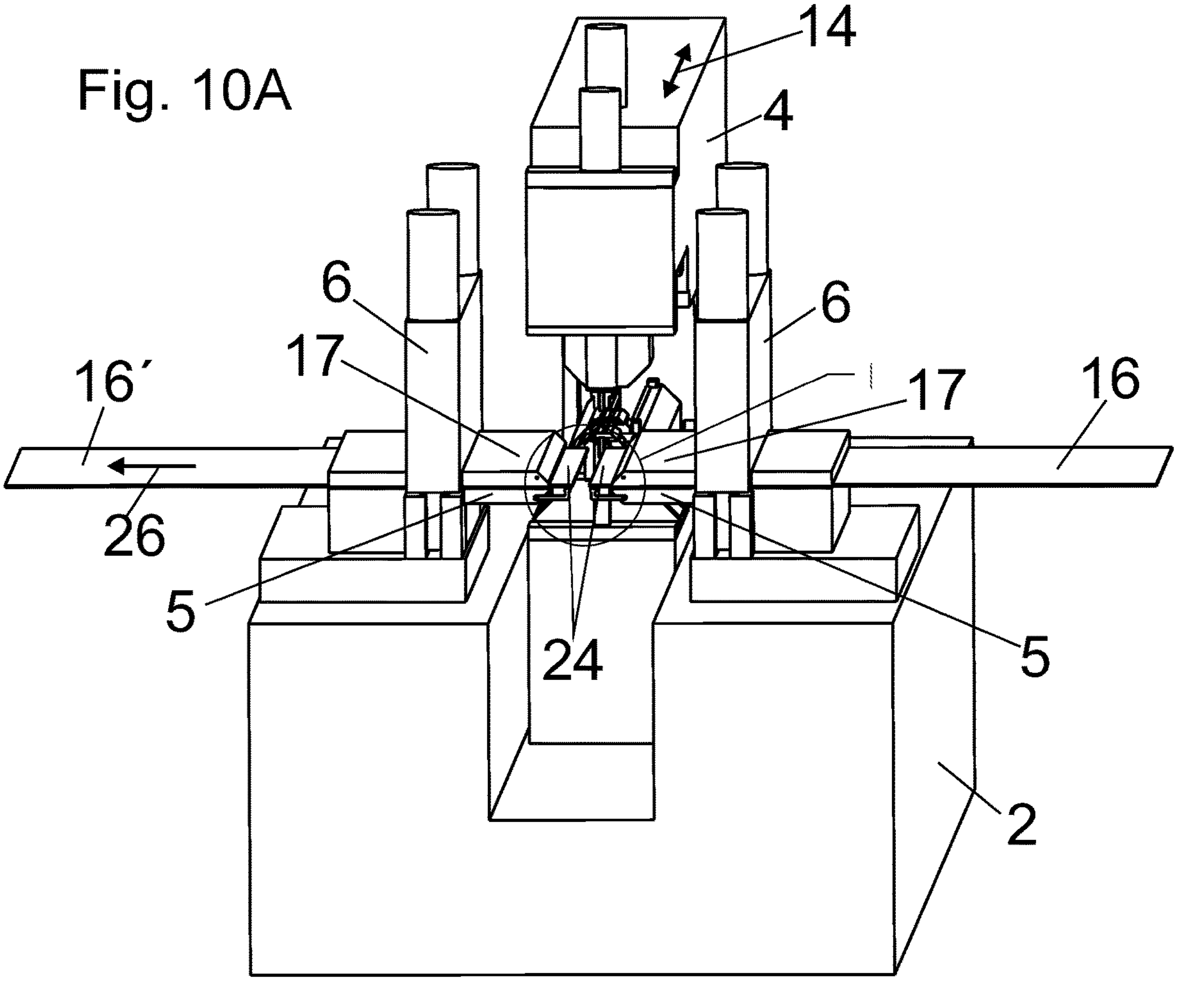
Figure 10B:
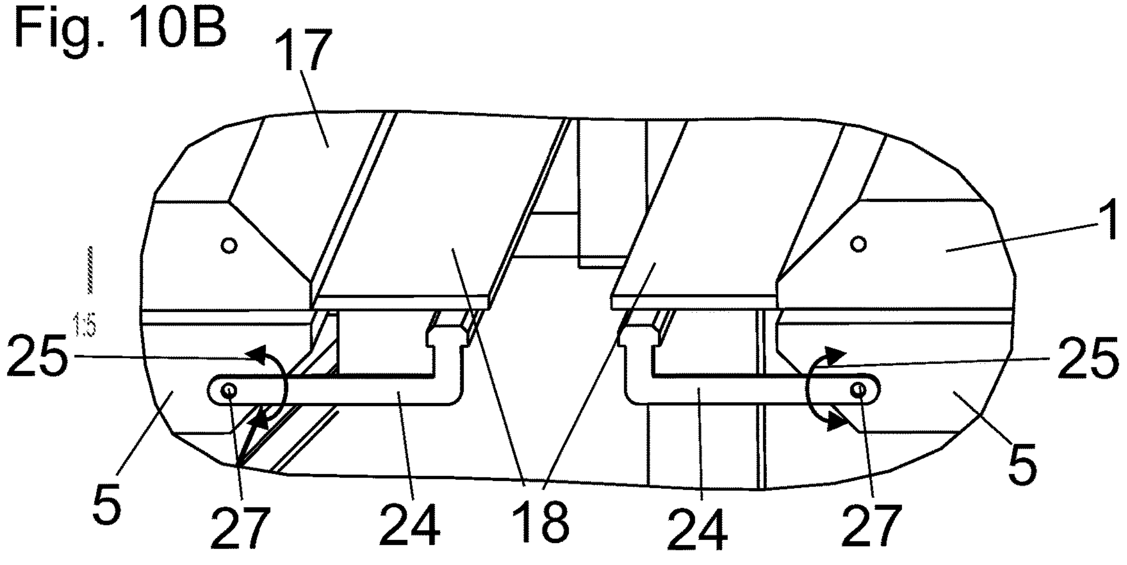

In the clamping and positioning device 6, the two strip ends 18 of the strips 16, 16' are positioned at a distance from each other and cut in a first processing step before welding, as can be seen better in FIG. 2B. The strip ends 18 of the strips 16, 16' have a largely geometrically indeterminate shape, e.g. due to a preliminary rolling process, which does not allow them to be welded together with the laser welding device 10. In order to be able to weld the two strip ends 18 in a fitting and closely adjacent manner, the strip ends 18 are simultaneously trimmed with a cutting device 7 known per se consisting of an upper blade 9 and a lower blade 8, e.g. in the form of double-cutting shears. For this purpose, the device 1 with the laser welding device 10 is moved so far to the right in the direction of movement 14 that the cutting device 7 covers the area of the clamping and positioning device 6 and the strip ends 18 come to lie between the upper blade 9 and the lower blade 8. The upper blades 9 then move downwards against the lower blades 8 and trim the two strip ends 18 smoothly and parallel to each other. Subsequently, the two strip ends 18 can be positioned under the laser welding head 10 by moving the clamping jaws 5 and 17 with the aid of positioning devices that cannot be seen further, so that the two strip ends 18 form the welding gap 23 by touching or almost touching each other, as more precisely shown in FIG. 6B.

In this cutting position of the cutting device 7 relative to the clamping and positioning device 6, the laser welding device 10 in FIG. 1 is located to the right of the clamping and positioning device 6 and is moved back into the starting position shown in FIG. 1 by moving the C-frame 4, whereby the laser welding head 10 successively welds the two strip ends 18 together in a known manner opposite a laser support roller 13. The two strip ends 18 are also positioned and aligned with respect to each other in the height direction by an alignment roller or smoothing roller 15 and a counter roller 19.

During the welding of the two strip ends 18, the temperature of the area of the welding zone is controlled in a manner known per se and, in particular, influenced with respect to the microstructure of the welding zone, in that a preheating device 11 is moved in advance in the welding direction 14 of the laser welding head 10 and a post-heating device 12 is moved in retrospect along the two strip ends 18 in the area of the welding zone together with the laser welding head 10. These may be, for example, gas burners or inductive devices which are positioned exactly above or also below the welding gap 23 between the two strip ends 18 and enable a targeted temperature control of the welding zone.

As already described above, the trimming of the strip ends 18 is problematic and imprecise, especially with high-strength strip materials, so that the welding of the strip ends 18 can suffer from this. Also, the wear of the blades 8, 9 of the cutting device 7 cannot be neglected, which can lead to downtimes of the device 1 for welding and cutting and thus downtimes of the processing device on which the device 1 for welding and cutting is arranged.

The present invention therefore takes advantage of the presence of the preheating device 11 and the post-heating device 12 in that the preheating device 11 and the post-heating device 12 can be used not only for tempering the welding zone but also for heating the cutting area of the strip ends 18 in the clamping and positioning device 6 and thus the advantages of the hot cutting of sheets, which are known per se, can also be used here with only a small amount of technical equipment.

The basic idea of the invention is to position the preheating device 11 and the post-heating device 12 relative to the cutting areas of the strip ends 18 in such a way that they can heat these cutting areas, i.e. the zone in which the upper blade 9 and the lower blade 8 cut the strip ends 18. For this purpose, the preheating device 11 and the post-heating device 12 are displaced in their position relative to the strip ends 18 in the direction of strip travel 26 and against the direction of strip travel 26, respectively, i.e. in such a way that, for example, the post-heating device 12 is displaced in the direction of the strip 16 and the preheating device 11 is displaced in the direction of the strip 16' a short distance away from the central region under the laser welding head 10, as can be seen more clearly in FIG. 4B. The heat-affected zone 20 of the post-heating device 12 and the heat-affected zone 21 of the preheating device 11 thus project a little into the interior of the respective strip end 18. If the C-frame 4 is now moved in the direction of movement 14 over the strip ends 18, the heat-affected zones 20, 21 successively cover the entire width of the strip ends 18 and heat them in strips exactly in the area in which the blades 8, 9 of the cutting device 7 shall trim the strip ends 18. This means that exactly this strip of the cutting areas of the strip ends 18 is heated and can be trimmed more easily and more precisely.

In a first embodiment, the process sequence for such a hot cut is shown and explained in more detail in FIGS. 2A, 2B, 3A, 3B, 4A, 4B, 5A, 5B, 6A, 6B, 7A, 7B, 8A, and 8B in the form of a flow chart. In the upper part of the figure, the entire welding and cutting device 1 can be seen, and in the lower part of the figure, the relevant area of this stage can be better seen in an enlarged section.

As shown in FIGS. 2A and 2B, the incoming strip 16 and the outgoing strip 16' are centered relative to each other in the clamping and positioning device 6 by means of lower jaws 5 and clamping jaws 17 and a drive which cannot be seen any further, and then tensioned between lower jaws 5 and clamping jaws 17. The C-frame 4 is in its basic position on the left. Then the C-frame 4 moves along the direction of movement 14 to the right to the cutting position in the area of the clamping and positioning device 6 and at the same time the preheating device 11 is moved in the direction of the outgoing strip 16' and the post-heating unit 12 is moved in the direction of the incoming strip 16 or vice versa and thus brought from the area of the welding gap 23 into the cutting area of the strip ends 18. This requires movement devices that are not further identifiable, such as pneumatic, hydraulic or electric drives and corresponding guide devices, but their construction and control effort is low. While the C-frame 4 moves from left to right in the cutting position, the preheating device 11 and the post-heating device 12 heat the cutting areas of the strip ends 18 (see FIGS. 3A, 3B and 4A, 4B). Subsequently, the cutting process is carried out in the cutting device 7 between the upper blade 9 and the lower blade 8 in the heated sections of the strip ends 18 and, at the same time, the preheating device 11 and the post-heating device 12 are returned to their required position for welding (FIGS. 5A and 5B).

The welding process takes place, as shown in FIGS. 6A and 6B, during the return movement of the C-frame 4 to its starting position according to FIG. 1. This welding process takes place with the aid of the preheating device 11 and the post-heating device 12, which have been returned to their basic positions (FIGS. 6A, 6B and 7A, 7B). The welding process is completed and the C-frame 4 is back in its basic position (FIGS. 7A and 7B).

FIGS. 8A, 8B, 9A, 9B, 10A, and 10B show a variant of the device 1 according to FIGS. 2A, 2B, 3A, 3B, 4A, 4B, 5A, 5B, 6A, 6B, 7A, 7B, 8A, and 8B, in which a linear and simultaneous heating of the cutting areas of the strip ends 18 takes place by means of bar-shaped inductor coils 24. These inductor bars 24 are mounted so as to be pivotable in the pivoting direction 25, approximately in the region of the clamping jaws 5, 17, and can be pivoted about their pivot bearings 27 by means of pivoting drives which cannot be seen further, in such a way that they pivot into the region of the strip ends 18 and rest there on these strip ends 18 in the cutting region of the strip ends 18. By means of current flow, the strip ends 18 are heated in a basically known manner in a linear manner under the inductor bar 24 and can thus be cut more easily. A movement of the C-frame 4 is not necessary for this type of heating by means of inductor bars 24. The inductor bars 24 can be pivoted either in the area of the clamping jaws 17 from above onto the strip ends 18 (see FIGS. 9A and 9B) or in the area of the clamping jaws 5 from below under the strip ends 18 (see FIGS. 10A and 10B). The aim of this arrangement of pivotable inductor bars 24 is to save cycle time, as the C-frame 4 is moved into the area of the clamping and positioning device 6 before the positioning process in cutting position with the cutting device 7. Before cutting, the inductor bars 24 then swivel from above or below towards the cutting area of the strip ends 18.

Figure 11:
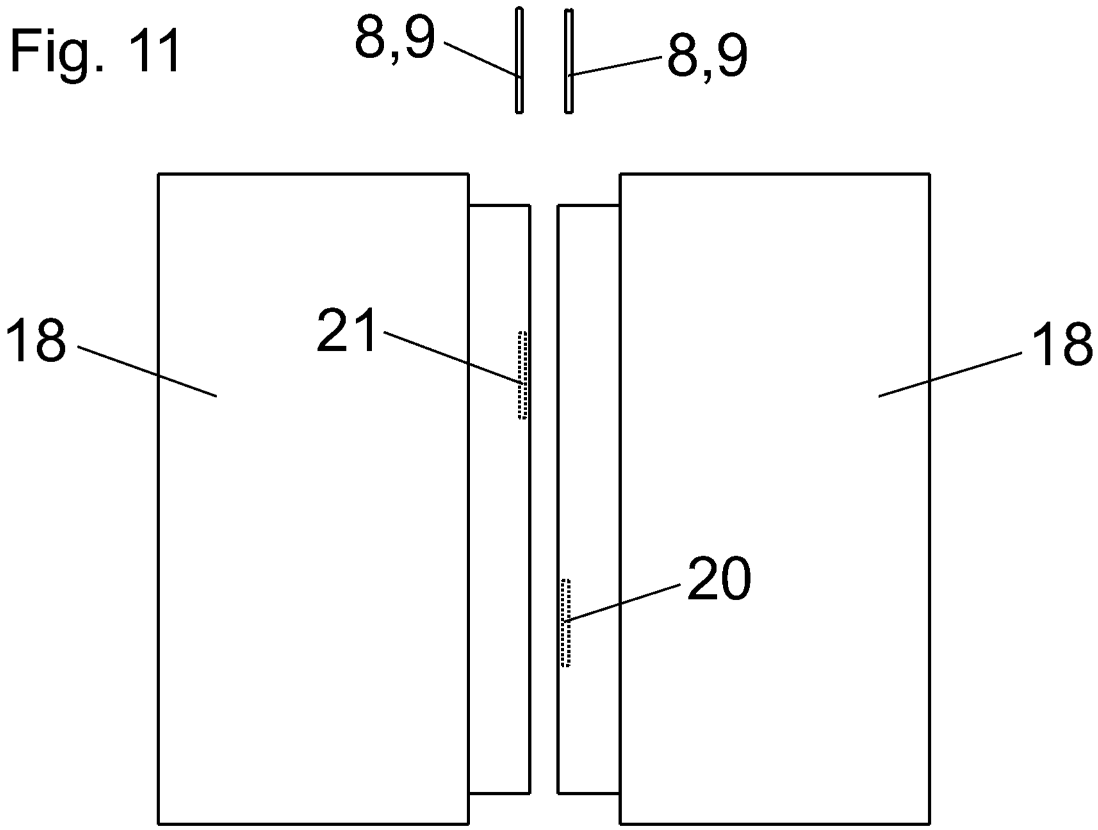
Figure 12:
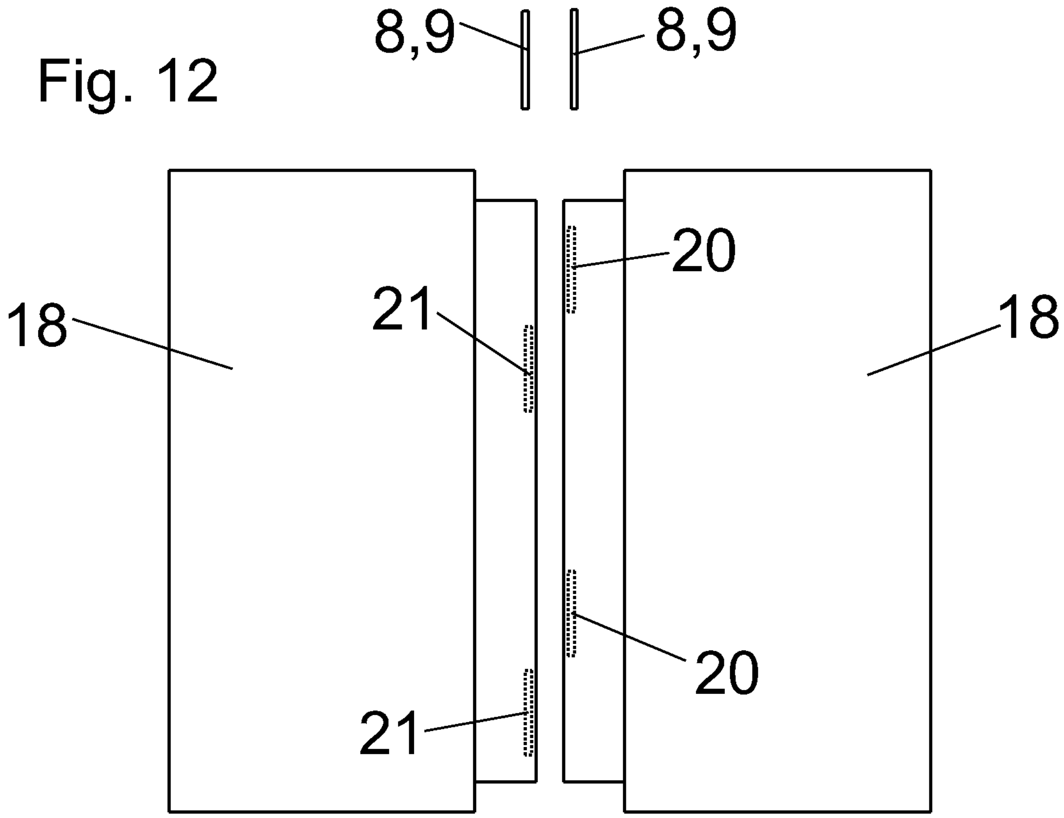
Figure 13:
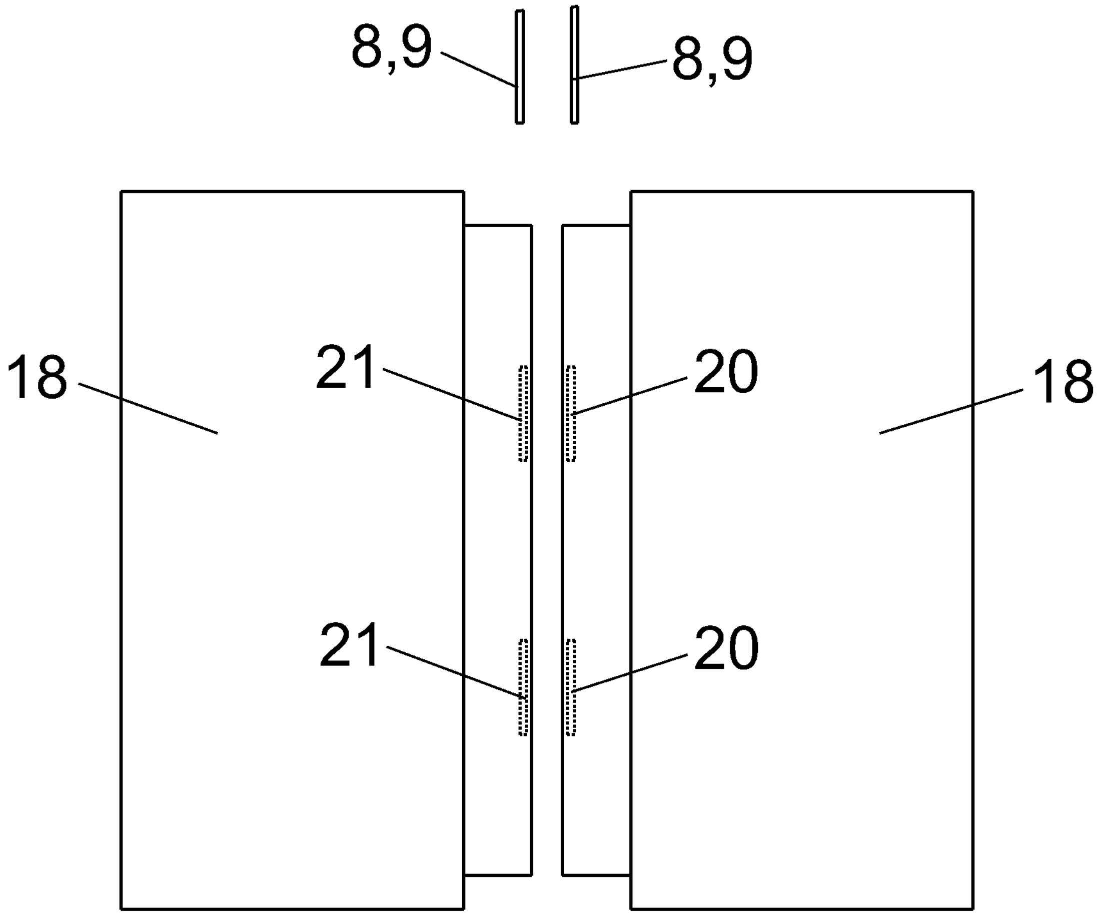

FIGS. 11 to 13 show different arrangements of heating zones 20, 21 of locally acting inductors as preheating device 11 and post-heating device 12, whereby FIG. 11 shows the arrangement of the preheating device 11 and post-heating unit 12 used in FIGS. 2A, 2B, 3A, 3B, 4A, 4B, 5A, 5B, 6A, 6B, 7A, 7B, 8A, and 8B. The heating zones 20, 21 of the preheating device 11 and the post-heating device 12 are aligned approximately in the cutting plane in the top view according to FIG. 11, symbolized by the position of the lower blade 8 and the upper blade 9. FIG. 12 shows two preheating devices 11 and two post-heating devices 12, identifiable by their heating zones 20, 21, positioned in pairs one behind the other, but longitudinally offset from one another, with the aim of equalizing the heating of the strip ends 18. FIG. 13 shows a heating process with four inductors, whereby each two preheating devices 11 and two reheating devices 12, identifiable by their heating zones 20, 21, are positioned in pairs opposite one another with the aim of equalizing the heating of the strip ends 18. It is also possible to design preheating devices 11 or post-heating devices 12 in such a way that they can each be divided and the parts can be moved separately outwards from the welding line. In this way, it is also possible to achieve temperature control of the cutting plane with only one preheating device 11 or one post-heating device 12. It is also conceivable to arrange preheating devices 11 and post-heating devices 12 above the C-frame 4.

Although only a few embodiments of the present invention have been shown and described, it is to be understood that many changes and modifications may be made thereunto without departing from the spirit and scope of the invention.

1—device for welding and trimming
2—Base frame
4—C-frame
5—lower jaw

6—Clamping and positioning device
7—Cutting device
8—lower blade
9—upper blade
10—Laser welding device
11—Preheating device
12—Post-heating device
13—Laser support roller
14—Direction of movement C-frame
15—Alignment roller/smoothing roller
16, 16'—strip
17—Clamping jaws
18—end of strip
19—counter roller
20—Heating zone post-heating device
21—heating zone preheating device
22—lateral shifting movement
23—welding gap
24—Induction bar
25—Pivoting movement of induction bar
26—strip running direction
27—swivel bearing

What is claimed is:

1. A device for trimming and welding strip ends for use on laser welding devices or resistance welding machines, in which the strip ends to be joined are positioned at a distance from one another and are trimmed parallel to one another with a mechanical cutting device before welding, wherein at least one heating device provided on the laser welding device or resistance welding machine for heating an actual welding region is configured to be positioned relative to a cutting region of the strip ends to be joined before trimming and is configured to be actuated in such a way that the cutting region is heated and at least one strip end of the strip ends is subsequently trimmed in the heated state.

2. The device according to claim 1, wherein the heating device is designed to heat the cutting region locally and to be movable along the cutting region.

3. The device according to claim 2, wherein the at least one heating device is arranged to be movable along the cutting region during a positioning of the laser welding device or resistance welding machine in a run-up to welding and before cutting.

4. The device according to claim 1, wherein the at least one heating device is adjustable transversely to a direction of movement of the laser welding device or resistance welding machine and is positionable in the cutting region.

5. The device according to claim 1, wherein the at least one heating device has a preheating device leading the laser welding device or resistance welding machine and a post-heating device trailing the laser welding device or resistance welding machine, which are each arranged transversely to a direction of movement of the laser welding device and adjustable in opposite directions.

6. The device according to claim 5, wherein the leading preheating unit heats an outgoing strip end of the strip ends and the trailing post-heating unit heats an incoming strip end of the strip ends or vice versa, in each case in the cutting region.

7. The device according to claim 1, wherein the at least one heating device comprises at least one of an induction heating device, a gas burner heating device, a hot air heating device and a laser heating device.

8. The device according to claim 1, wherein the at least one heating device is hydraulically and/or electrically and/or pneumatically adjustably arranged in a region of the laser welding device or resistance welding machine.

9. The device according to claim 8, wherein the at least one heating device is adjustably arranged transversely to a direction of movement of the laser welding device or resistance welding machine.

10. The device according to claim 1, wherein the at least one heating device has at least one induction coil or other heating device which, after positioning relative to the cutting region of the strip ends to be joined, simultaneously heats at least one longitudinally extending section along the cutting region.

11. The device according to claim 10, wherein the at least one induction coil is arranged pivotably in a region of the laser welding device or resistance welding machine and is configured to be positioned laterally pivotably in the cutting region.

12. The device according to claim 10, wherein the at least one induction coil is arranged pivotably on a clamping and positioning device.

13. The device according to claim 12, wherein the at least one induction coil is arranged pivotably above an upper clamping jaw of the clamping and positioning device or below a lower clamping jaw of the clamping and positioning device.

14. The device according to claim 10, wherein the at least one induction coil is arranged pivotably on the laser welding device or resistance welding machine in a region of the cutting device.

15. The device according to claim 14, wherein the at least one induction coil is arranged pivotably above an upper blade of the cutting device or below a lower blade of the cutting device.

16. The device according to claim 1, wherein the heating devices are arranged on the laser welding device or resistance welding machine in a region above the strip ends to be welded.

17. A method for heating strip ends to be joined by welding for use on laser welding devices or resistance welding machines, in which the strip ends to be joined are positioned at a distance from one another and are cut parallel to one another with a mechanical cutting device before welding, the method comprising the steps of:

prior to trimming, positioning and actuating at least one heating device provided on the laser welding device or resistance welding machine for heating an actual welding region relative to at least one cutting edge of the strip ends to be joined in such a way that a cutting region is heated and at least one strip end of the strip ends is subsequently cut in the heated state.

18. The method according to claim 17, wherein the at least one heating device moves along the cutting area during positioning of the laser welding device or resistance welding machine prior to welding and cutting and heats the cutting region.

19. The method according to claim 17, wherein the at least one heating device is moved back into an area of the laser welding device or resistance welding machine in which the at least one heating device effects the heating of the welding region after heating of the cutting region and the trimming of the strip ends and before welding.

20. The method according to claim 17, wherein, after heating the cutting regions of the strip ends, the heated strip ends are mechanically trimmed.

21. The method according to claim 17, wherein the at least one heating device has an induction coil and, after positioning relative to the cutting region, simultaneously heats at least one longitudinally extended section along the cutting region.

* * * * *